(12) United States Patent
Peng et al.

(10) Patent No.: US 10,784,635 B2
(45) Date of Patent: Sep. 22, 2020

(54) SENSING APPARATUS, PIERCING TERMINAL, STAMPING STRIP AND CORRESPONDING METHODS

(71) Applicant: SHENZHEN MINJIE ELECTRONICS TECH CO., LTD., Shenzhen (CN)

(72) Inventors: Huajun Peng, Shenzhen (CN); Li Wang, Shenzhen (CN); Guoliang Hua, Shenzhen (CN); Jieman Wu, Shenzhen (CN)

(73) Assignee: SHENZHEN MINJIE ELECTRONICS TECH CO., LTD., Shenzhen (CN)

( * ) Notice: Subject to any disclaimer, the term of this patent is extended or adjusted under 35 U.S.C. 154(b) by 64 days.

(21) Appl. No.: 16/063,082

(22) PCT Filed: Dec. 19, 2016

(86) PCT No.: PCT/CN2016/110762
§ 371 (c)(1),
(2) Date: Jun. 15, 2018

(87) PCT Pub. No.: WO2017/101879
PCT Pub. Date: Jun. 22, 2017

(65) Prior Publication Data
US 2019/0356095 A1 Nov. 21, 2019

(30) Foreign Application Priority Data

Dec. 18, 2015 (CN) .......................... 2015 1 0956502
Jun. 21, 2016 (CN) .......................... 2016 1 0451508
Aug. 15, 2016 (CN) .......................... 2016 1 0670963

(51) Int. Cl.
*H01R 12/68* (2011.01)
*H01R 12/77* (2011.01)
(Continued)

(52) U.S. Cl.
CPC ............. *H01R 27/00* (2013.01); *H01R 12/68* (2013.01); *H01R 12/77* (2013.01); *H01R 43/01* (2013.01); *H01R 43/16* (2013.01)

(58) Field of Classification Search
CPC ........ H01R 12/67; H01R 12/68; H01R 12/79; H01R 43/01; H01R 43/16; H01R 27/00
See application file for complete search history.

(56) References Cited

U.S. PATENT DOCUMENTS 4,027,521 A * 6/1977 McKee .................. B21D 53/36
72/404
4,466,689 A * 8/1984 Davis ..................... H01R 43/16
206/717

(Continued)

FOREIGN PATENT DOCUMENTS

CN 101465508 A 6/2009
CN 202947812 U 5/2013

(Continued)

OTHER PUBLICATIONS

International Search Report as issued in International Patent Application No. PCT/CN2016/110762, dated Mar. 16, 2017.

(Continued)

*Primary Examiner* — Edwin A. Leon
*Assistant Examiner* — Milagros JeanCharles
(74) *Attorney, Agent, or Firm* — Pillsbury Winthrop Shaw Pittman LLP

(57) ABSTRACT

A sensing apparatus, a piercing terminal, a stamping strip and a corresponding method are provided. Flat copper wires at tail ends of parallel wires of a FPC film are pierced, pressed tightly and fixed by first to fourth spikes on a metal strip. The first to fourth spikes are electrically connected to the flat copper wires at positions where the flat copper wires are pierced respectively, achieving an electrical connection between two piercing terminals and the two flat copper wires (Continued)

at the tail ends of the parallel wires of the FPC film, helping ensure the reliability of the electrical connection. Further, the piercing terminals are suitable for parallel wires of FPC films with different specifications.

18 Claims, 13 Drawing Sheets

(51) Int. Cl.
*H01R 27/00* (2006.01)
*H01R 43/01* (2006.01)
*H01R 43/16* (2006.01)

(56) References Cited

U.S. PATENT DOCUMENTS

| | | | | |
|---|---|---|---|---|
| 4,561,714 A | * | 12/1985 | Byczek | H01R 12/68 439/408 |
| 4,784,623 A | * | 11/1988 | Beck, Jr. | H01R 12/68 439/872 |
| 4,847,992 A | * | 7/1989 | Sato | H01R 43/01 29/863 |
| 5,409,386 A | | 4/1995 | Banakis et al. | |
| 5,848,920 A | * | 12/1998 | Klein | H01R 12/721 439/885 |
| 5,875,546 A | * | 3/1999 | Cachina | B23K 35/0244 29/843 |
| 6,083,060 A | * | 7/2000 | Chen | H01R 43/16 439/876 |
| 7,513,792 B2 | * | 4/2009 | Kumakura | H01R 4/182 439/422 |
| 2001/0016449 A1 | * | 8/2001 | Aoki | H01R 12/68 439/422 |
| 2002/0048989 A1 | * | 4/2002 | Sawada | H01R 4/245 439/404 |
| 2002/0132534 A1 | * | 9/2002 | Serbin | H01R 4/184 439/877 |
| 2007/0270021 A1 | * | 11/2007 | Shuey | H01R 12/68 439/422 |
| 2010/0178794 A1 | | 7/2010 | Hsu | |
| 2015/0063423 A1 | | 3/2015 | Hua | |
| 2015/0332817 A1 | | 11/2015 | Fujita et al. | |

FOREIGN PATENT DOCUMENTS

| | | |
|---|---|---|
| CN | 104697660 A | 6/2015 |
| CN | 105424214 A | 3/2016 |
| EP | 0 674 474 A1 | 9/1995 |
| JP | 2724681 B2 | 3/1998 |
| WO | WO 2014/152877 A1 | 9/2014 |

OTHER PUBLICATIONS

Written Opinion of the International Searching Authority as issued in International Patent Application No. PCT/CN2016/110762, dated Mar. 16, 2017.

* cited by examiner

SENSING APPARATUS, PIERCING TERMINAL, STAMPING STRIP AND CORRESPONDING METHODS

This application is the U.S. national phase entry of PCT patent application no. PCT/CN2016/110762, which was filed on Dec. 19, 2016, which claims the benefit of priority of Chinese patent application no. 201510956502.6, which was filed on Dec. 18, 2015, Chinese patent application no. 201610451508.2, which was filed on Jun. 21, 2016, and Chinese patent application no. 201610670963.1, which was filed on Aug. 15, 2016.

TECHNICAL FIELD

The present disclosure relates to a sensing apparatus, a piercing terminal, a stamping strip and a method for connecting a stamping strip to parallel wires of a Flexible Printed Circuit (FPC) film.

BACKGROUND

Currently, a two-pin FPC connector is generally used to be connected to flat copper wires at tail ends of two parallel wires of a FPC film. A center distance between two pins of the FPC connector is the same as that between the two flat copper wires at the tail ends of the parallel wires of the FPC film. However, the center distance between two pins of each FPC connector is fixed. As a result, each FPC connector can only be connected to parallel wires of a FPC film having the same center distance between two flat copper wires thereof as a center distance between two pins of the FPC connector. When the distance between the two flat copper wires of the parallel wires of the FPC film to be connected is changed, it is necessary to use a FPC connector with another specification, thereby resulting in that the FPC connector cannot be used universally.

SUMMARY

The present disclosure aims to overcome the deficiencies in the related art described above, and to provide a sensing apparatus, and a piercing terminal for connecting tail ends of parallel wires of a FPC film, wherein the piercing terminal can be connected to parallel wires of FPC films having different center distances between two flat copper wires thereof.

According to one aspect of the present disclosure, there is provided a sensing apparatus, comprising: a temperature sensor comprising: an upper film, a lower film, at least two wires provided between and covered by the upper film and the lower film, and a NTC (Negative Temperature Coefficient) thermistor welded between the wires; and a piercing terminal connected to tail ends of parallel wires of a FPC film of the temperature sensor, and comprising: a barbed metal strip and a rear end terminal connected to the metal strip, the metal strip has a width not greater than that of flat copper wires at the tail ends of the parallel wires of the FPC film, and provided with a plurality of spikes extending perpendicularly and outwardly from one side of the metal strip along a lengthwise direction of the metal strip and a plurality of spikes extending perpendicularly and outwardly from the other side of the metal strip along the lengthwise direction, and projections of the plurality of spikes onto a projection plane perpendicular to the metal strip and extending along the lengthwise direction of the metal strip are arranged in turn at equal intervals.

According to some embodiments, the upper film and the lower film each have a thickness less than 1 mm.

According to some embodiments, the upper film and the lower film are each made of polyimide, PET plastic, aramid or aromatic polyamide, polyetheretherketone, polytetrafluoroethylene, polycarbonate, polyethylene, thermoplastic polyester or polystyrene.

According to some embodiments, the wires are formed by a calendering process, a printing process, or a chemical etching process.

According to some embodiments, the NTC thermistor is a die-type thermistor (SMD type thermistor), a diode-type thermistor, or a single-ended glass sealed-type thermistor.

According to some embodiments, a terminal or a connector receptacle is connected to a tail end of the temperature sensor.

According to another aspect of the present disclosure, there is provided a piercing terminal to be connected to tail ends of parallel wires of a FPC film, comprising a barbed metal strip and a rear end terminal connected to the metal strip, the metal strip has a width not greater than that of flat copper wires at the tail ends of the parallel wires of the FPC film, and provided with a plurality of spikes extending perpendicularly and outwardly from one side of the metal strip along a lengthwise direction of the metal strip and a plurality of spikes extending perpendicularly and outwardly from the other side of the metal strip along the lengthwise direction, and projections of the plurality of spikes onto a projection plane perpendicular to the metal strip and extending along the lengthwise direction of the metal strip are arranged in turn at equal intervals.

According to a further aspect of the present disclosure, there is provided a stamping strip, comprising a positioning strip of metal material and a plurality of above-described piercing terminals, the plurality of piercing terminals being arranged in parallel to each other at equal intervals, and are perpendicularly and fixedly connected to the positioning strip.

Further, a plurality of protrusions and plurality of positioning grooves, which are provided alternately at equal intervals, are symmetrically provided on two sides of the positioning strip along a lengthwise direction of the positioning strip, the protrusions have a same width as that of the positioning grooves, at least one of the protrusions and at least one of the positioning grooves are provided between positions on the positioning strip which correspond to two adjacent piercing terminals, the protrusions are perpendicular to a surface of the positioning strip, and a center distance between the protrusion and the positioning groove is the same as a center distance between two flat copper wires at the tail ends of the parallel wires of the FPC film; and a plurality of positioning holes which are arranged at equal intervals are further provided in the middle of the positioning strip along the lengthwise direction of the positioning strip, and at least two ones of the positioning holes between positions on the positioning strip which correspond to two adjacent piercing terminals has a center distance, which is the same as that between the two flat copper wires at the tail ends of the parallel wires of the FPC film.

According to some embodiments, the positioning strip and the piercing terminals are integrally formed into a stamped piece.

According to some embodiments, the positioning strip and the piercing terminals each have a material of phosphor bronze, phosphor copper or brass.

According to some embodiments, the positioning strip and the piercing terminals each have a thickness not more than 1 mm.

According to a still further aspect of the present disclosure, there is further provided a method for connecting the stamping strip described above to tail ends of parallel wires of a FPC film, including steps of: stacking at least two stamping strips when a center distance between two adjacent metal strips on the stamping strip is greater than a center distance between two flat copper wires of the parallel wires of the FPC film; causing a center distance between two adjacent metal strips on the stacked stamping strips to become equal to the center distance between the two flat copper wires of the parallel wires of the FPC film; and finally connecting two adjacent piercing terminals of the two stacked stamping strips to the two flat copper wires at tail ends of the parallel wires of the FPC film by a stamping process in a piercing manner.

According to some embodiments, when a center distance between two adjacent rear end terminals on the stamping strips is greater than the center distance between the two flat copper wires of the parallel wires of the FPC film, at least one of the two adjacent rear end terminals is biased towards the outside of a central line of the two adjacent metal strips.

According to a yet another of the present disclosure, there is provided an integrated film type temperature sensor, comprising: an upper film and a lower film, at least two wires are arranged between and covered by the upper film and the lower film, and an NTC thermistor welded between the wires.

According to some embodiments, a terminal or a connector receptacle is connected to a tail end of the integrated film type temperature sensor.

According to some embodiments, the upper film and the lower film each have a thickness less than 1 mm.

According to some embodiments, the upper film and the lower film are each made of polyimide, PET plastic, aramid or aromatic polyamide, polyetheretherketone, polytetrafluoroethylene, polycarbonate, polyethylene, thermoplastic polyester or polystyrene.

According to some embodiments, the NTC thermistor is a die-type thermistor (SMD type thermistor), a diode-type thermistor, or a single-ended glass sealed-type thermistor.

According to a yet still further aspect of the present disclosure, there is provided a production device for manufacturing an integrated film type temperature sensor, comprising: a first guide wheel; a guide groove located downstream of the first guide wheel; a die located directly above a front end of the guide groove, and configured to punch and cut off wires; a manipulator (or a guide wheel) located downstream of the guide groove and configured to pull the wires; second guide wheels located on upper and lower sides of the first guide wheel respectively and configured to guide films; a hot pressing roller located downstream of the manipulator (or the guide wheel); and a slitter located downstream of the hot pressing roller; glue is coated onto inner sides of an upper film and a lower film respectively, a plurality of NTC resistors are welded between two parallel wires at an interval so that a group of copper wires is formed, and multiple groups of copper wires are spaced apart in parallel to each other and are guided to enter the front end of the guide groove via the first guide wheel, the die punches and cuts off the wires, the manipulator (or guide wheel) pulls the cut copper wires along the guide groove to a position between the upper film and the lower film coated with the glue, the cut wires are clamped between the two films coated with the glue and guided to enter the hot pressing roller so as to be hot pressed, and the slitter slits the hot-pressed films.

According to some embodiments, the wires are formed by a calendering process, a printing process, or a chemical etching process.

According to some embodiments, the films each have a thickness less than 1 mm.

According to some embodiments, the films are each made of polyimide, PET plastic, aramid or aromatic polyamide, polyetheretherketone, polytetrafluoroethylene, polycarbonate, polyethylene, thermoplastic polyester or polystyrene.

According to some embodiments, the NTC resistor is a die-type thermistor (SMD type thermistor), a diode-type thermistor, or a single-ended glass sealed-type thermistor.

According to some embodiments, the hot pressing temperature is 170-250 degrees Celsius.

According to another aspect of the present disclosure, there is provided a method for manufacturing an integrated film type temperature sensor, comprising: step 1, manufacturing multiple groups of wires, each group of wires being composed of two parallel wires and NTC resistors welded between the two parallel wires at an interval; step 2, providing a film with holes by punching; step 3, manufacturing unit modules; for each group of wires, the wires are punched and cut off at positions where the NTC resistors are welded so that a number of unit modules are formed; step 4, clamping the unit modules formed in step 3 between two films coated with glue and hot-pressing the unit modules by the hot pressing roller; in practice, a punching size is controlled so that after the upper film and the lower film are combined together, they completely cover the NTC thermistor soldered on one end of the wire and completely cover the wire, and that the wire has one face exposed at a tail end of the wire and an opposite face covered at the tail end by the film; step 5, manufacturing a NTC temperature sensor, and punching and slitting the film type temperature sensor which is hot pressed in step 4 so that the film type temperature sensor is separated.

The present disclosure provides a piercing terminal, a stamping strip, and a method for connecting a stamping strip to parallel wires of a FPC film. Flat copper wires at tail ends of parallel wires of a FPC film are pierced, pressed tightly and fixed by a plurality of spikes on a metal strip. The plurality of spikes are electrically connected to the flat copper wires at positions where the flat copper wires are punctured respectively, which achieves an electrical connection between two piercing terminals and the two flat copper wires at the tail ends of the parallel wires of the FPC film, and effectively ensures the reliability of the electrical connection between the piercing terminals and the two flat copper wires at the tail ends of the parallel wires of the FPC film. Further, the piercing terminals may be connected to tail ends of parallel wires of FPC films having different center distances between two flat copper wires thereof, and are suitable for parallel wires of FPC films with different specifications. At the same time, the piercing terminals according to the present disclosure are arranged on the stamping strip at equal intervals, and two adjacent piercing terminals on the stamping strip are connected to the two flat copper wires at the tail ends of the parallel wires of the FPC film through a punch in a piercing manner, which achieves the purposes of high efficiency and large-scale production.

BRIEF DESCRIPTION OF THE DRAWINGS

In order to more clearly describe the technical solutions of the present disclosure, the accompanying drawings to be used in the embodiments will be briefly described below. Obviously, the accompanying drawings in the following description are merely some embodiments of the present disclosure, and those of ordinary skill in the art can obtain other accompanying drawings according to these accompanying drawings without contributing any creative work.

DETAILED DESCRIPTION

The technical solutions according to the embodiments of the present disclosure will be clearly and completely described below with reference to the accompanying drawings in the embodiments of the present disclosure.

Figure 1:
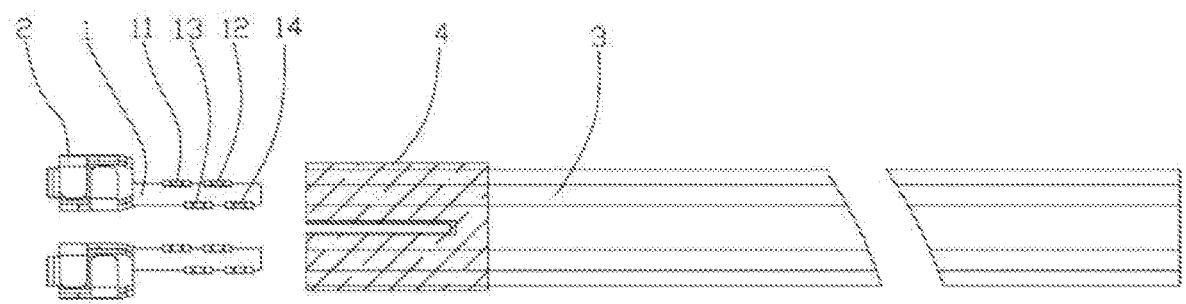
FIG. 1 is a view showing that a piercing terminal has not been combined with tail ends of parallel wires of a FPC film by a stamping process according to an embodiment of the present disclosure.
Figure 2:
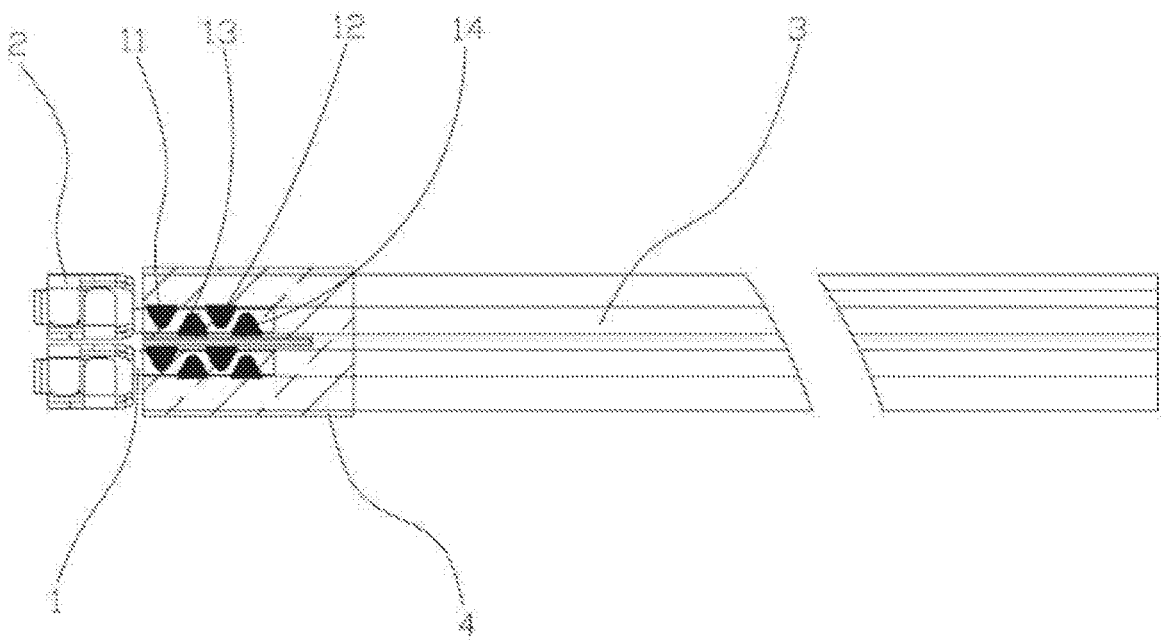
FIG. 2 is a view showing that the piercing terminal in FIG. 1 has been combined with the tail ends of the parallel wires of the FPC film by a stamping process.
Figure 3:
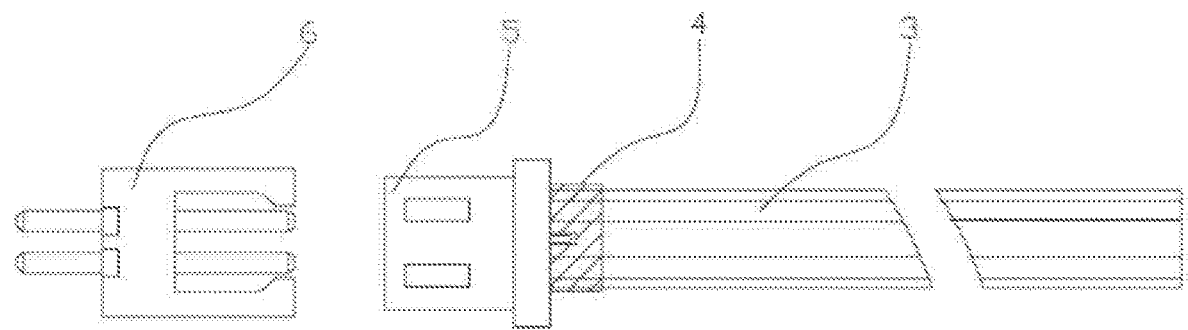
FIG. 3 is a view showing that the tail ends of the parallel wires of the FPC film are plugged into hole receptacles and needle receptacles after being combined with the piercing terminal, as shown in FIG. 2, by a stamping process.

FIG. 1 is a view showing that a piercing terminal has not been combined with tail ends of parallel wires of a FPC film by a stamping process, according to an embodiment of the present disclosure. FIG. 2 is a view showing that the piercing terminal in FIG. 1 has been combined with the tail ends of the parallel wires of the FPC film by a stamping process. FIG. 3 is a view showing that the tail ends of the parallel wires of the FPC film are plugged into hole receptacles and needle receptacles after being combined with the piercing terminal, as shown in FIG. 2, by a stamping process. As shown in FIGS. 1 to 3, a piercing terminal according to an embodiment of the present disclosure comprises a barbed metal strip 1 and a rear end terminal 2. The metal strip 1 has a width not greater than that of flat copper wires 3 at the tail ends of the parallel wires of the FPC film. The metal strip 1 is provided with a first spike 11 and a second spike 12 extending perpendicularly and outwardly from one side of the metal strip 1 in a lengthwise direction thereof. The metal strip 1 is further provided with a third spike 13 and a fourth spike 14 extending perpendicularly and outwardly from the other side of the metal strip 1 in the lengthwise direction thereof. Projections of the first spike 11, the third spike 13, the second spike 12 and the fourth spike 14 onto a projection plane perpendicular to the metal strip 1 and extending along the lengthwise direction of the metal strip 1 are provided at equal intervals. Although it is described in the above embodiment that two spikes are provided to extend perpendicularly and outwardly from one side of the metal strip 1 in the lengthwise direction thereof, it will be also expected by those skilled in the art that more spikes may be formed to adapt to different application scenes.

According to an embodiment of the present disclosure, when the piercing terminal is connected to the tail ends of the parallel wires of the FPC film by a stamping process, the first spike 11, the second spike 12, the third spike 13 and the fourth spike 14 on the metal strip 1 pierce flat copper wires 3 at the tail ends of the parallel wires of the FPC film provided with a reinforcing plate 4 respectively, and are bent towards opposite sides of the flat copper wires 3 respectively, so that sharp points of the first spike 11, the second spike 12, the third spike 13 and the fourth spike 14 are tightly pressed against and fixed to the reinforcing plate 4 at the tail ends of the parallel wires of the FPC film. In this way, a connection between the piercing terminal and the tail ends of the parallel wires of the FPC film is realized. As the first spike 11, the second spike 12, the third spike 13 and the fourth spike 14 pierce the flat copper wires 3 at the tail ends of the parallel wires of the FPC film, the first spike 11, the second spike 12, the third spike 13 and the fourth spike 14 are electrically connected to the flat copper wires 3 at positions where the flat copper wires 3 are pierced respectively.

In an embodiment of the present disclosure, a rear end of the metal strip 1 is fixedly connected to a front end of the rear end terminal 2, and the parallel wires of the FPC film are connected to the piercing terminal by a stamping process and are electrically connected to an external circuit through the rear end terminal 2. In the present embodiment, the rear end terminal 2 is plugged into a hole socket 5, and the hole socket 5 is plugged into a needle socket 6. In other embodiments, after two piercing terminals on the stamping strip are connected to the two flat copper wires 3 at the tail ends of the parallel wires of the FPC film by a stamping process, rear end terminals 2 at the other end of the two piercing terminals may also be connected to wires.

Figure 4:
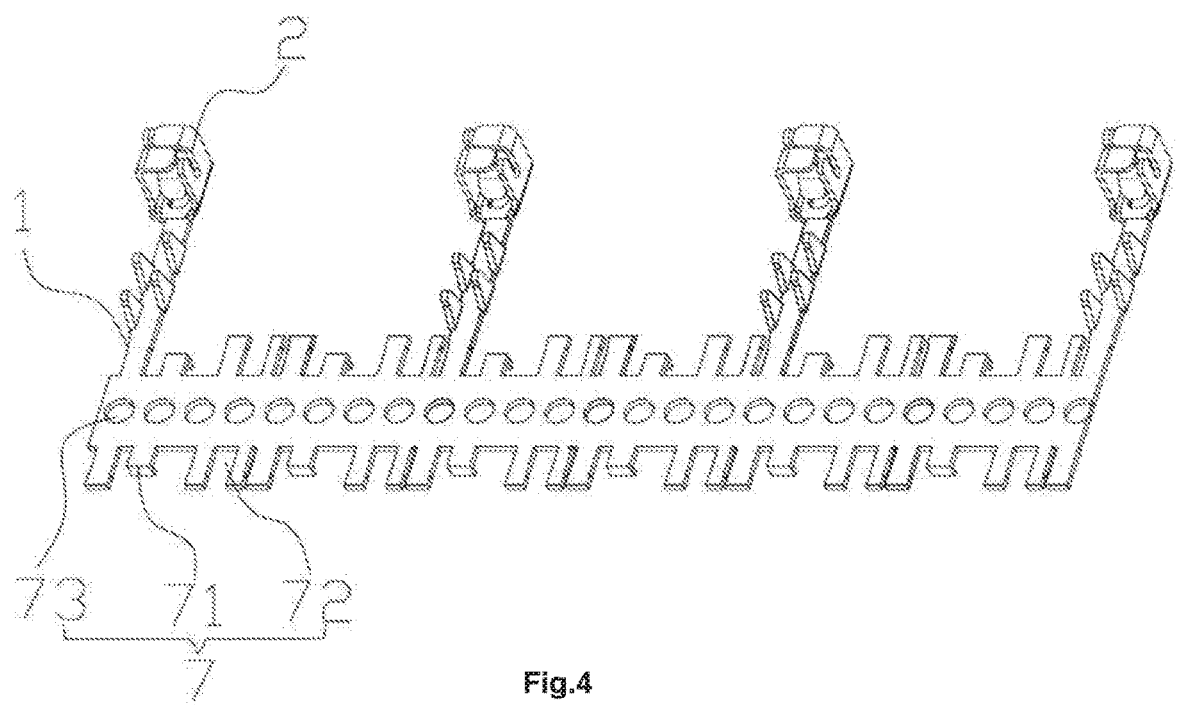
FIG. 4 is a perspective view showing that a rear end terminal of a piercing terminal on a stamping strip is biased towards a left side of a central line of a metal strip, according to an embodiment of the disclosure.
Figure 5:
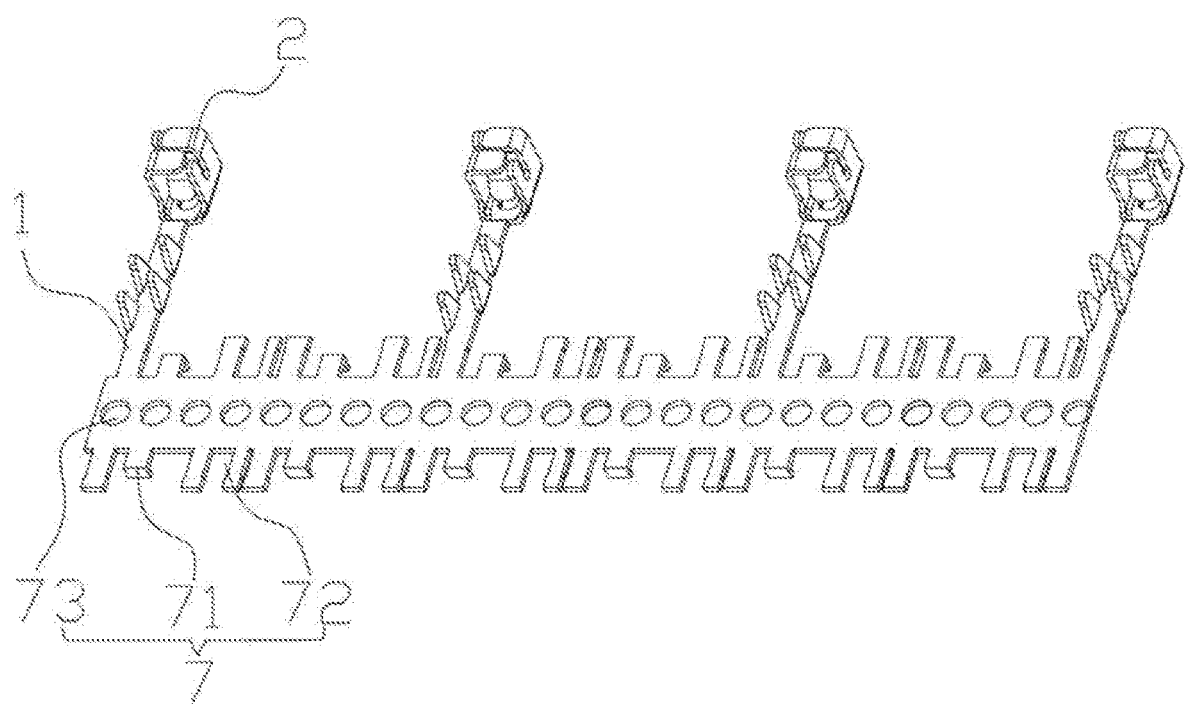
FIG. 5 is a perspective view showing that a rear end terminal of a piercing terminal on a stamping strip is biased towards a right side of a central line of a metal strip, according to an embodiment of the present disclosure.
Figure 6:
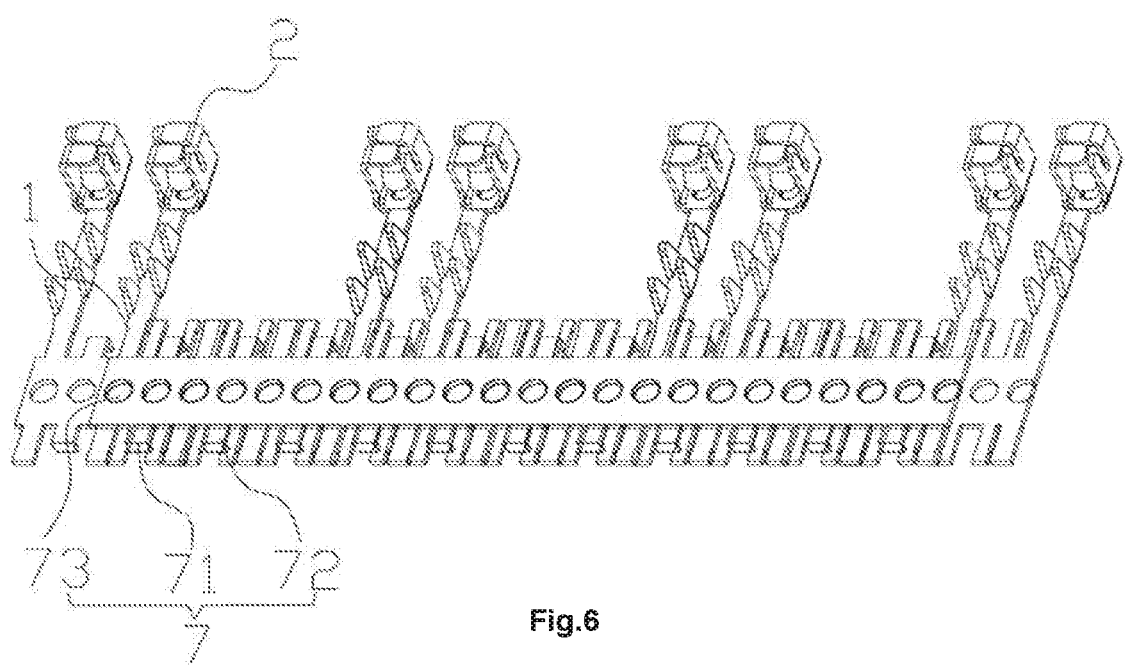
FIG. 6 is a perspective view showing that the stamping strip in FIG. 4 and the stamping strip in FIG. 5 are stacked before being stamped.

FIG. 4 is a perspective view showing that a rear end terminal of a piercing terminal on a stamping strip is biased towards a left side of a central line of a metal strip, according to an embodiment of the disclosure. FIG. 5 is a perspective view showing that a rear end terminal of a piercing terminal on a stamping strip is biased towards a right side of a central line of a metal strip, according to another embodiment of the present disclosure. FIG. 6 is a perspective view showing that the stamping strip in FIG. 4 and the stamping strip in FIG. 5 are stacked before being stamped. As shown in FIG. 2 and FIGS. 4 to 6, the present disclosure further provides a stamping strip, which comprises a positioning strip 7 of a metal material and a plurality of piercing terminals. The plurality of piercing terminals are arranged in parallel to each other at equal intervals, and are perpendicularly and fixedly connected to the positioning strip 7.

As shown in FIGS. 4 to 6, a plurality of protrusions 71 and positioning grooves 72 which are alternately provided at equal intervals are symmetrically arranged on two sides of the positioning strip 7 along a lengthwise direction of the positioning strip 7. The protrusions 71 have a same width as that of the positioning grooves 72, and at least one protrusion 71 and at least one positioning groove 72 are provided between positions on the positioning strip 7 which correspond to two adjacent piercing terminals. The protrusions 71 are perpendicular to a surface of the positioning strip 7, and a center distance between the protrusion 71 and the positioning groove 72 is the same as a center distance between the two flat copper wires 3 at the tail ends of the parallel wires of the FPC film. A plurality of positioning holes 73 which are arranged at equal intervals are further provided in the middle of the positioning strip 7 along the lengthwise direction of the positioning strip 7, and at least two positioning holes 73 between positions on the positioning strip 7, which correspond to two adjacent piercing terminals, have a center distance which is the same as that between the two flat copper wires 3 at the tail ends of the parallel wires of the FPC film.

According to an embodiment of the present disclosure, when stacking the stamping strips together and connecting them to the tail ends of the parallel wires of the FPC film, firstly, protrusions 71 of one stamping strip are snap-fit with positioning grooves 72 of the other stamping strip, and a center distance between metal strips 1 of two adjacent piercing terminals on the stacked stamping strips is caused to be equal to that between the two flat copper wires 3 at the tail ends of the parallel wires of the FPC film. In this way, relative movement of the stacked stamping strips during a stamping process can be avoided. Further, as at least two positioning holes 73 between positions on the positioning strip 7 which correspond to two adjacent piercing terminals has a center distance which is the same as that between the two flat copper wires 3 at the tail ends of the parallel wires of the FPC film, positioning holes 73 on two positioning strips 7 are aligned and coincide with each other after the stamping strips are stacked. Thereby, the stacked stamping strips can be directly connected to the tail ends of the parallel wires of the FPC film through a punch in a piercing manner, which significantly improves the production efficiency of the piercing terminals.

Specifically, the positioning strip 7 and the piercing terminals are integrally formed by a stamping process.

Specifically, the positioning strip 7 and the piercing terminals have a material such as phosphor bronze, phosphor copper or brass.

Specifically, the positioning strip 7 and the piercing terminals each have a thickness not more than 1 mm.

Figure 7:
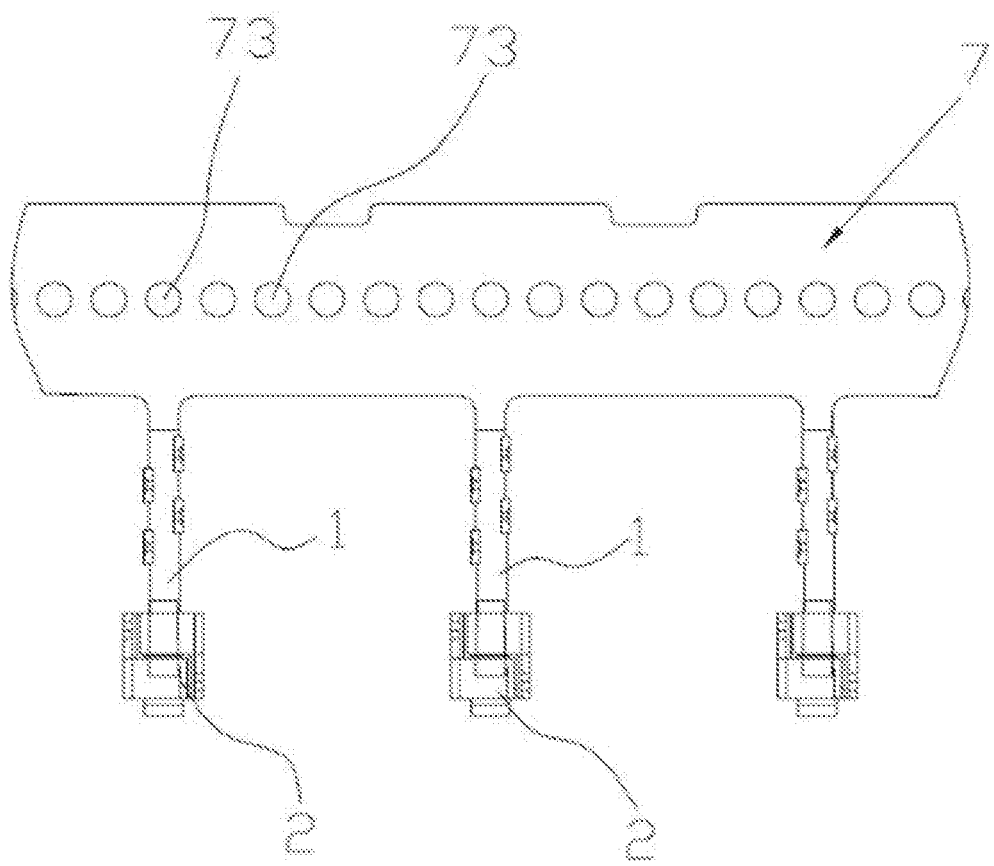
FIG. 7 is a view showing that a central line of a rear end terminal of a piercing terminal on a stamping strip coincides with a central line of a metal strip, according to an embodiment of the present disclosure.
Figure 8:
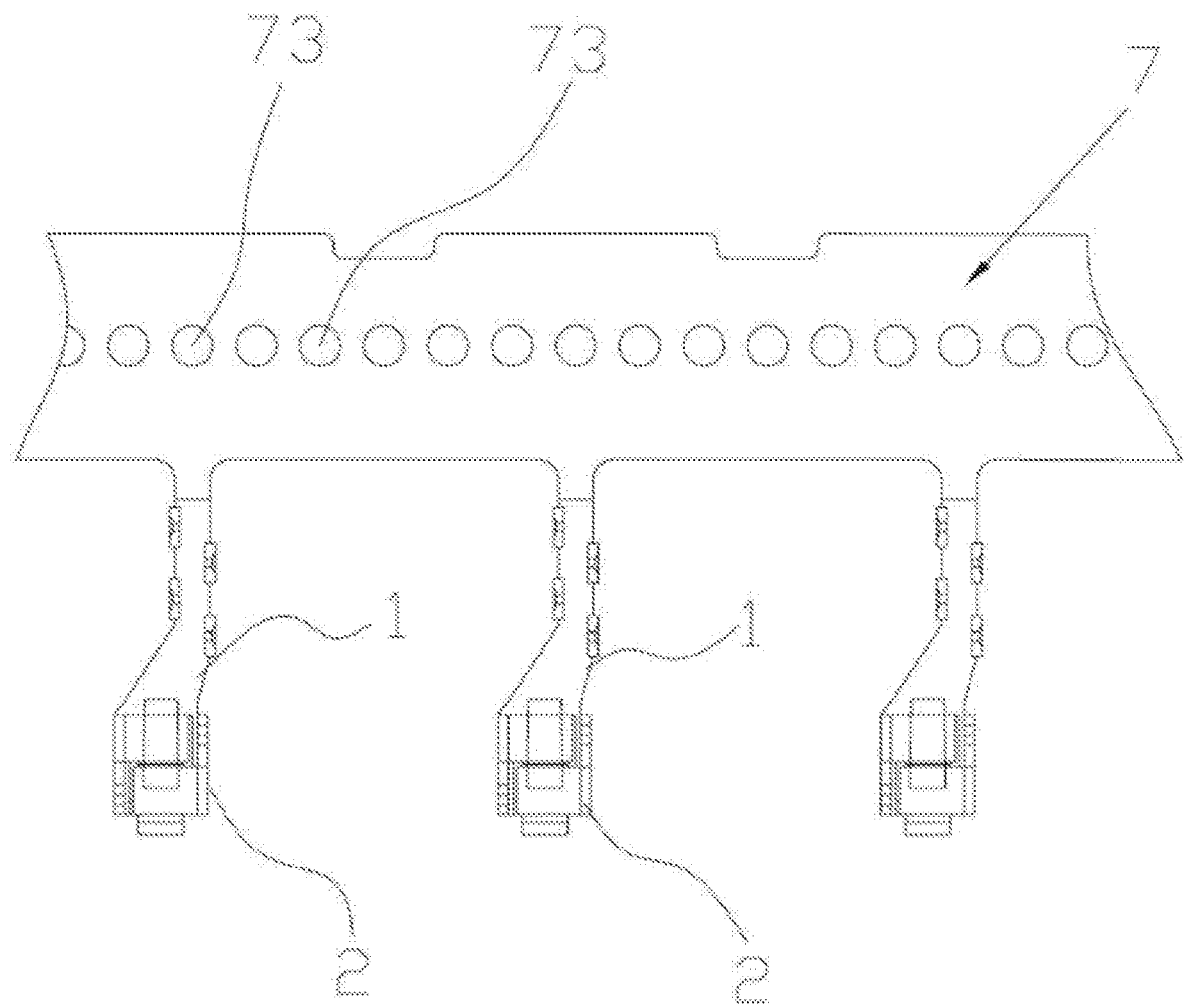
FIG. 8 is a view showing that a rear end terminal of a piercing terminal on a stamping strip is biased towards a left side of a central line of a metal strip, according to an embodiment of the present disclosure.
Figure 9:
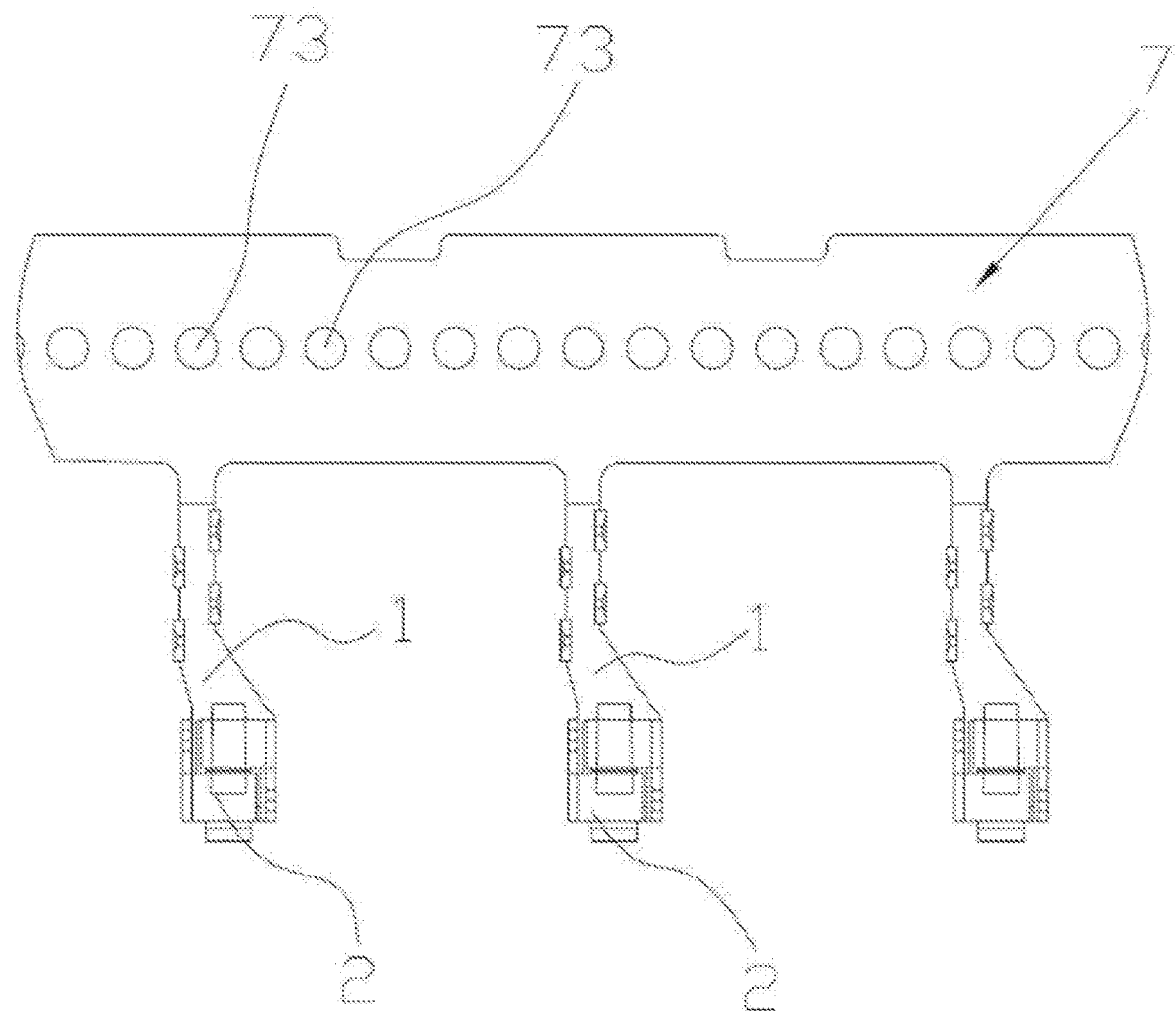
FIG. 9 is a view showing that a rear end terminal of a piercing terminal on a stamping strip is biased towards a right side of a central line of a metal strip, according to an embodiment of the present disclosure.
Figure 10:
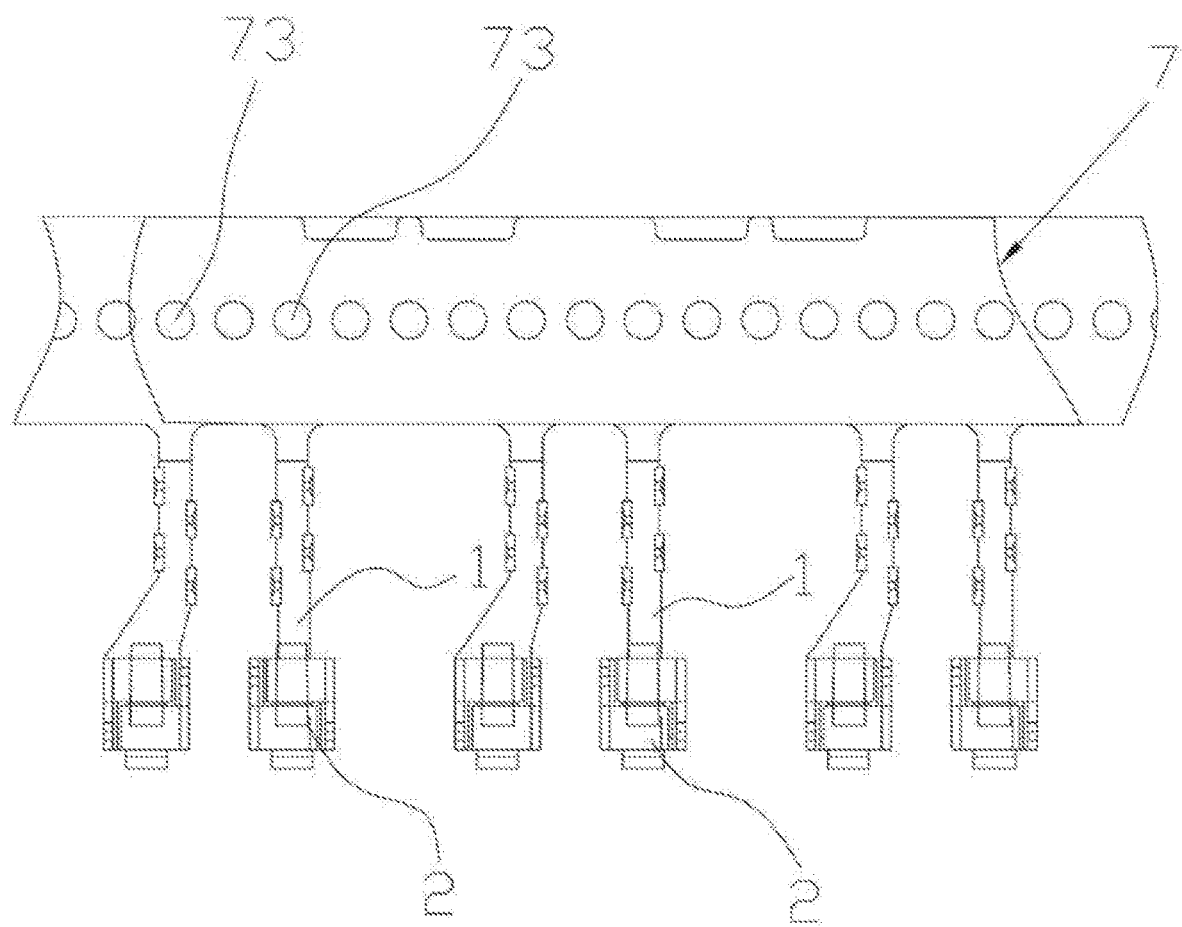
FIG. 10 is a view showing that the stamping strip in FIG. 7 and the stamping strip in FIG. 8 are stacked before being stamped.
Figure 11:
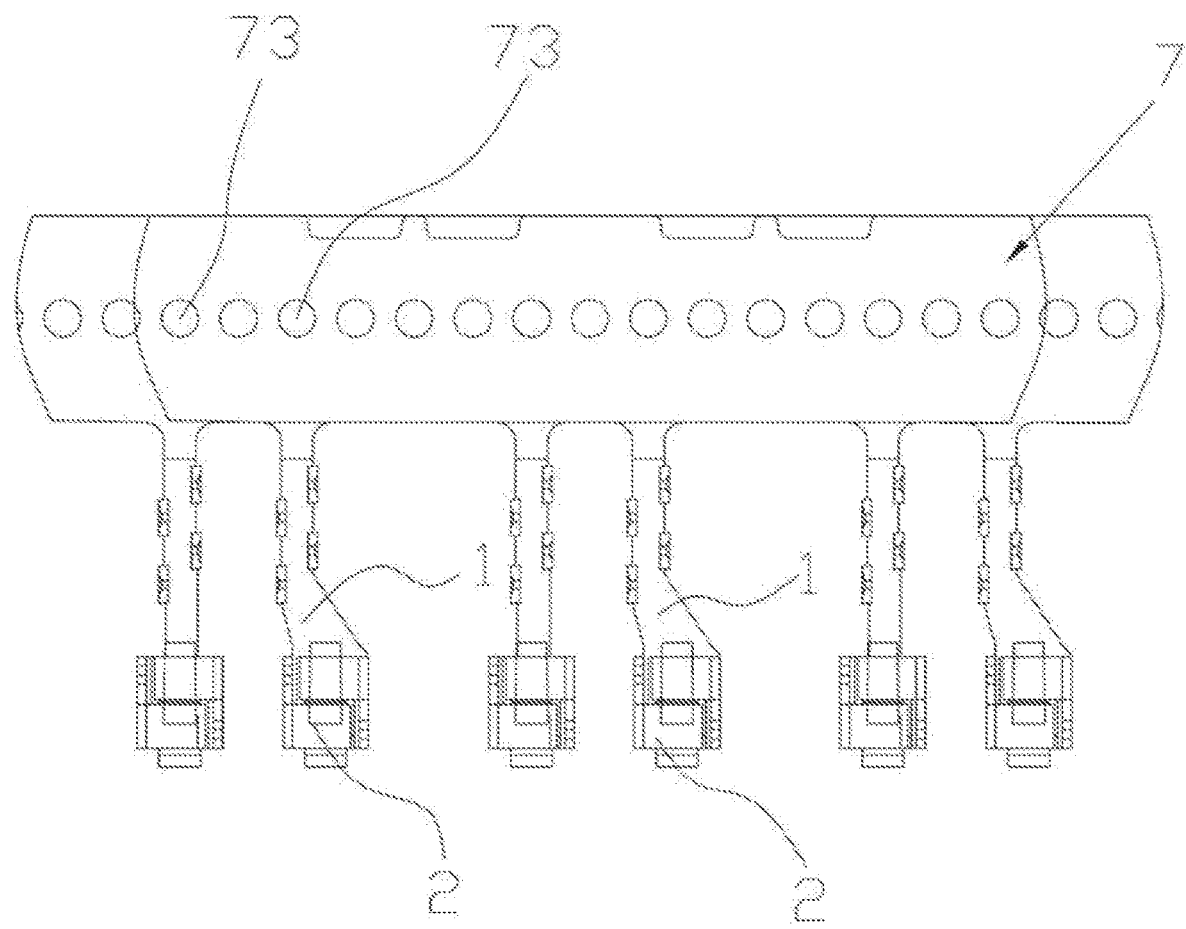
FIG. 11 is a view showing that the stamping strip in FIG. 7 and the stamping strip in FIG. 9 are stacked before being stamped.
Figure 12:
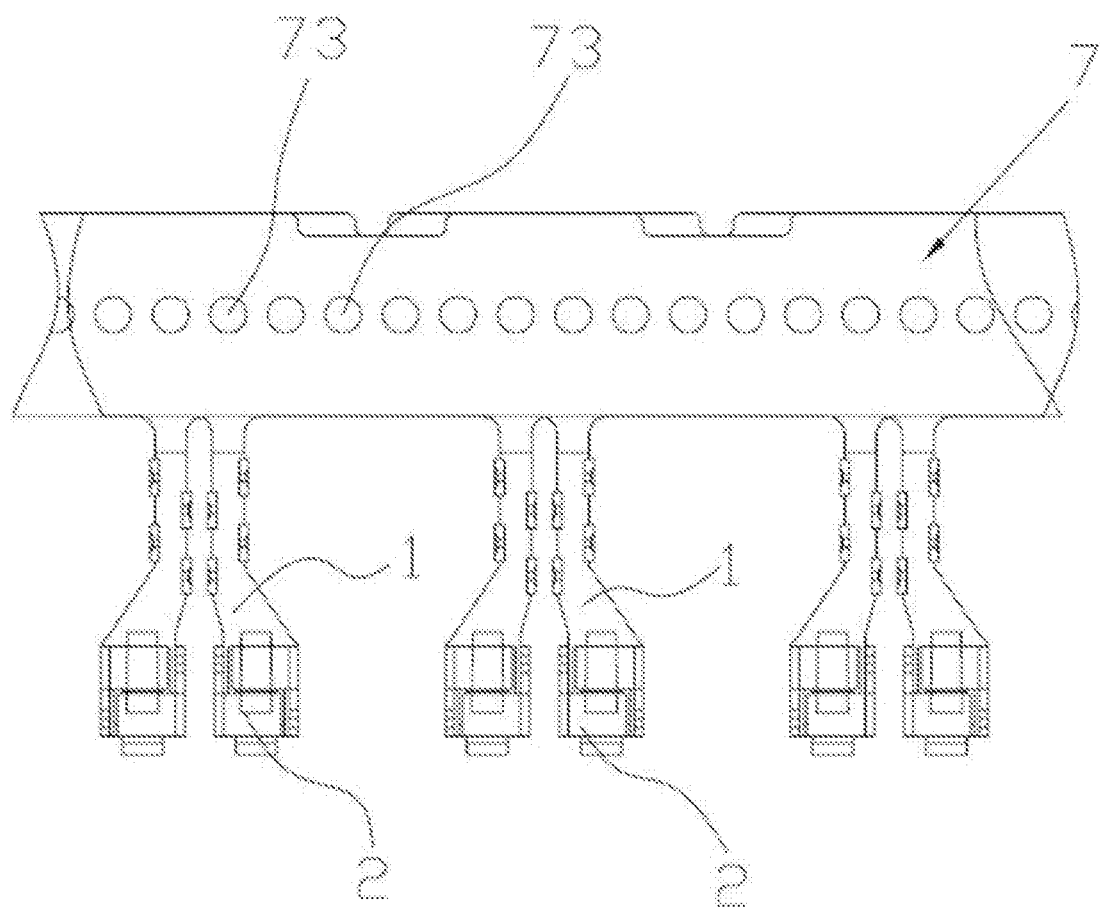
FIG. 12 is a view showing that the stamping strip in FIG. 8 and the stamping strip in FIG. 9 are stacked before being stamped.

FIG. 7 is a view showing that a central line of a rear end terminal of a piercing terminal on a stamping strip coincides with a central line of a metal strip, according to an embodiment of the present disclosure. FIG. 8 is a view showing that a rear end terminal of a piercing terminal on a stamping strip is biased towards a left side of a central line of a metal strip, according to an embodiment of the present disclosure. FIG. 9 is a view showing that a rear end terminal of a piercing terminal on a stamping strip is biased towards a right side of a central line of a metal strip, according to an embodiment of the present disclosure. Further, FIG. 10 is a view showing that the stamping strip in FIG. 7 and the stamping strip in FIG. 8 are stacked before being stamped. FIG. 11 is a view showing that the stamping strip in FIG. 7 and the stamping strip in FIG. 9 are stacked before being stamped. FIG. 12 is a view showing that the stamping strip in FIG. 8 and the stamping strip in FIG. 9 are stacked before being stamped.

As shown in FIG. 2 and FIGS. 4 to 12, the present disclosure further provides a method for connecting the stamping strip described above to tail ends of parallel wires of a FPC film. When a center distance between two adjacent metal strips 1 on the stamping strip is greater than that between two flat copper wires 3 at the tail ends of the parallel wires of the FPC film, at least two stamping strips are stacked, such that a center distance between two adjacent metal strips 1 on the stacked stamping strips is equal to that between the two flat copper wires 3 at the tail ends of the parallel wires of the FPC film, and finally two adjacent piercing terminals which are stacked together are connected to the two flat copper wires 3 at the tail ends of the parallel wires of the FPC film by a stamping process in a piercing manner.

Specifically, when a center distance between two adjacent rear end terminals 2 on the stamping strip is greater than that between the two flat copper wires 3 at the tail ends of the parallel wires of the FPC film, at least one of the two adjacent rear end terminals 2 is biased towards the outside of a central line of the two adjacent metal strips 1.

The present disclosure provides a piercing terminal, a stamping strip, and a method for connecting a stamping strip to parallel wires of a FPC film. Flat copper wires 3 at tail ends of parallel wires of a FPC film are pierced, pressed tightly and fixed by a first spike 11, a second spike 12, a third spike 13 and a fourth spike 14 on a metal strip 1. The first spike 11, the second spike 12, the third spike 13 and the fourth spike 14 are electrically connected to the flat copper wires 3 at positions where the flat copper wires 3 are pierced respectively, which achieves electrical connection between two piercing terminals and the two flat copper wires 3 at the tail ends of the parallel wires of the FPC film, and effectively ensures the reliability of the electrical connection between the piercing terminals and the two flat copper wires at the tail ends of the parallel wires of the FPC film. Further, the piercing terminals may be connected to tail ends of parallel wires of FPC films having different center distances between two flat copper wires 3 thereof, and are suitable for parallel wires of FPC films with different specifications. At the same time, the piercing terminals according to the present disclosure are arranged on the stamping strip at equal intervals, and two adjacent piercing terminals on the stamping strip are connected to the two flat copper wires 3 at the tail ends of the parallel wires of the FPC film through a punch in a piercing manner, which achieves the purposes of high efficiency and large-scale production.

In addition, a thermistor temperature sensor is a type of temperature sensor which measures a temperature by using the principle that a resistance value of a conductor or a semiconductor changes with the temperature, and comprises a film type thermistor, a NTC temperature sensor, or the like.

In some cases, in the film type thermistor a die-type thermistor is encapsulated in a film through a metal bracket, and then the metal bracket is soldered to pins of the thermistor by tin soldering. Soldering tin is dissolved at temperature of about 180° C., and thus when the temperature exceeds 180° C., the pins of the thermistor may be separated from the bracket due to dissolution of the soldering tin, which results in failure in measurement of the temperature. Further, such film thermistor generally has the longest length of only 50 mm, and needs to be connected through wires, and also needs insulation treatment performed at positions where the wires are connected, thus has great limitations on the usage environment and application scope thereof.

Figure 13:
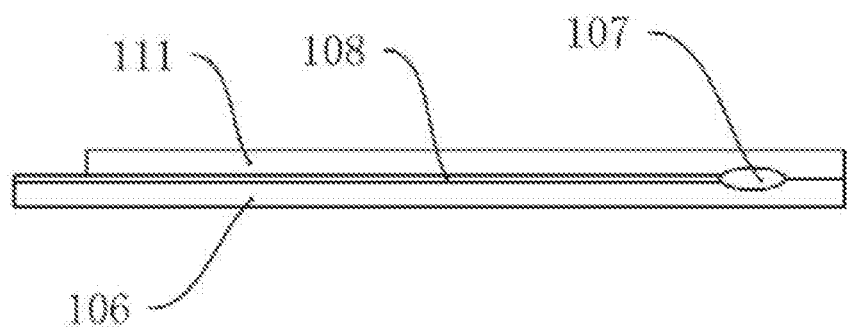
FIG. 13 is a sectional view of an integrated film type temperature sensor according to an embodiment of the present disclosure.

In order to solve the above problems, the embodiments of the present disclosure further provide an integrated film temperature sensor. As shown in FIG. 13, the integrated film temperature sensor comprises an upper film 111 and a lower film 106, at least two wires 108 are provided between and covered by the upper film and the lower film, and a NTC thermistor 107 is welded between the wires 108.

Figure 14:
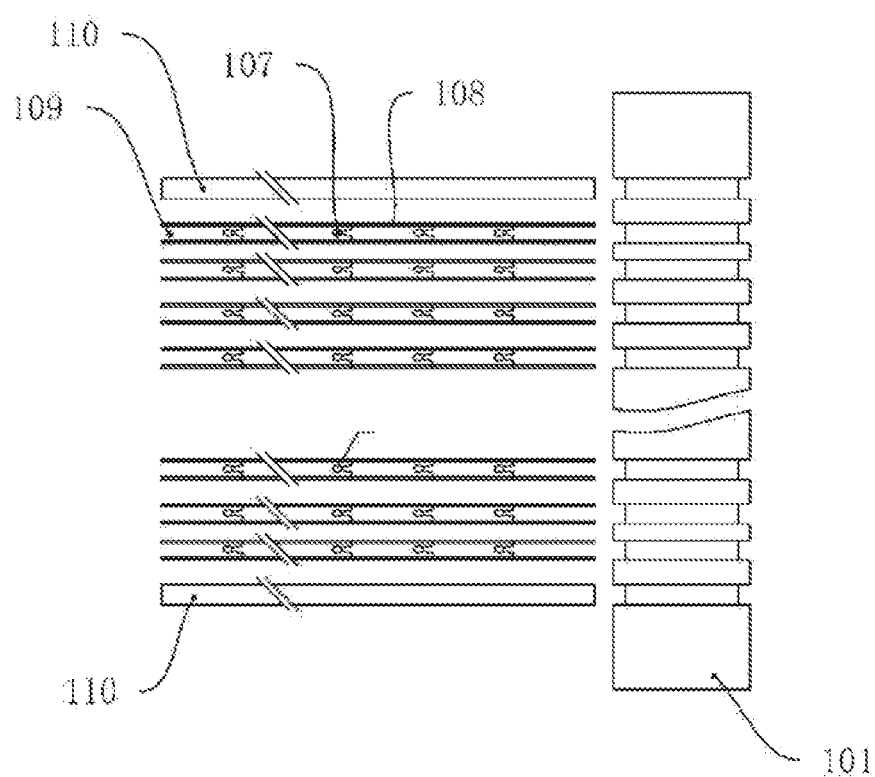
FIG. 14 is a view of a production device for manufacturing an integrated film type temperature sensor according to a first embodiment of the present disclosure.
Figure 15:
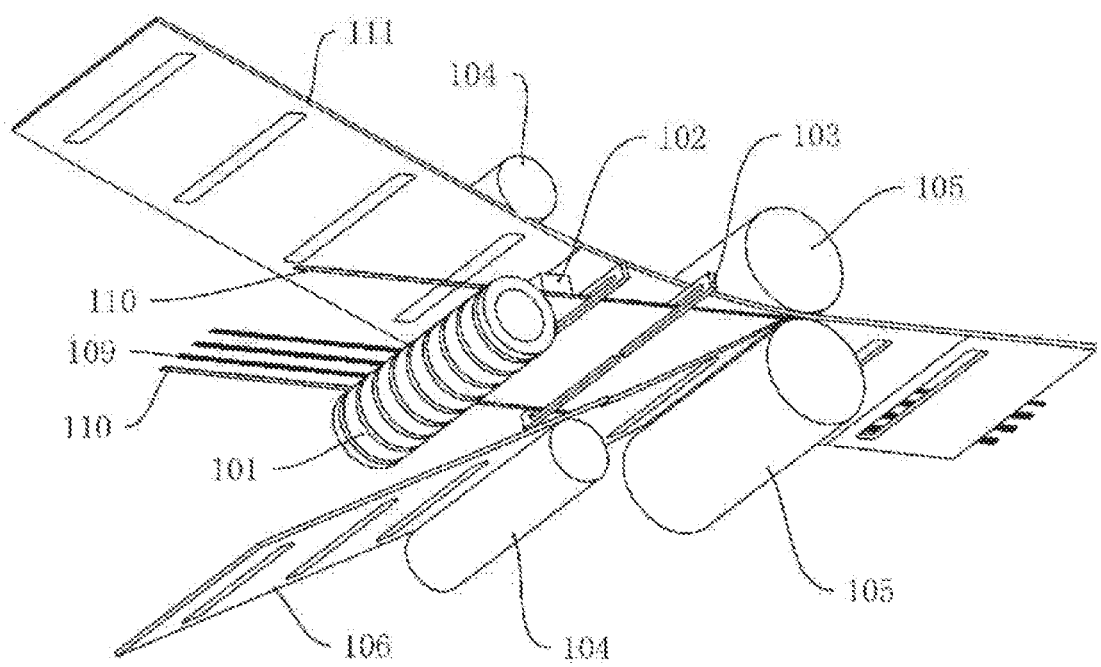
FIG. 15 is a plan view of a group of wires according to the first embodiment of the present disclosure.

In a first embodiment of the present disclosure, as shown in FIGS. 14 and 15, a production device for manufacturing an integrated film temperature sensor comprises: a first guide wheel 101; a guide groove located downstream of the first guide wheel 101; a die 102 located directly above a front end of the guide groove, and configured to punch and cut off wires; a manipulator 103 located downstream of the guide groove and configured to pull the wires; second guide wheels 104 located at upper and lower sides of the first guide wheel 101 respectively and configured to guide an upper film 111 and a lower film 106; a hot pressing roller 105 located downstream of the manipulator 103; and a slitter located downstream of the hot pressing roller 105. Glue is coated on inner sides of the upper film 111 and the lower film 106, a plurality of NTC resistors 107 are welded at an interval between two parallel wires 108 so that a group of wires 109 are formed, and multiple groups of wires 109 are spaced in parallel to each other and enter the front end of the guide groove via the first guide wheel 101, the die 102 punches and cuts off the wires 108, the manipulator 103 pulls the cut wires 108 along the guide groove to a position between the upper film 111 and the lower film 106 coated with the glue, the cut wires 108 are clamped between the upper film 111 and the lower film 106 coated with the glue and enter the hot pressing roller 105 so as to be hot pressed by the hot pressing roller 105, and the slitter slits the hot-pressed upper film 111 and lower film 106.

The integrated film temperature sensor according to the present disclosure comprises at least two glue-coated layers which are an upper film 111 and a lower film 106, at least two wires 108, and a NTC resistor 107 welded between the wires 108. The wires 108 are formed by a calendering, printing, or chemical etching process. The upper film 111 and the lower film 106 each have a thickness less than 1 mm. The upper film 111 and the lower film 106 are each made of film materials such as polyimide, PET plastic, aramid, aromatic polyamide, polyetheretherketone, polytetrafluoroethylene, polycarbonate, polyethylene, thermoplastic polyester or polystyrene, etc. The NTC resistor comprises a die-type thermistor (SMD type thermistor), a diode-type thermistor, or a single-ended glass sealed-type thermistor. Specifically, the hot pressing roller 105 has a hot pressing temperature of 170-250 degrees Celsius.

According to an embodiment of the present disclosure, a method for manufacturing an integrated film type temperature sensor comprises the following steps. In step 1, multiple groups of wires are manufactured. Each group of wires is composed of two parallel wires and NTC resistors welded between the two parallel wires at an interval. Then, in step 2, a film is provided with holes by punching. In step 3, unit modules are manufactured. Specifically, for each group of wires, the wires are punched and cut off at positions where the NTC resistors are welded so that a number of unit modules are formed. In step 4, the unit modules formed in step 3 are clamped between two films coated with glue and are hot-pressed by the hot pressing roller. In a specific operation, a punching size is controlled so that after the upper film and the lower film are combined together, they completely cover the NTC thermistor soldered on one end of the wire and completely cover the wire. The wire has one face exposed at a tail end of the wire and an opposite face covered at the tail end by the film. In step 5, a NTC temperature sensor is manufactured, and the film type temperature sensor which is hot pressed in step 4 is punched and slit so that the film type temperature sensor is separated.

Figure 16:
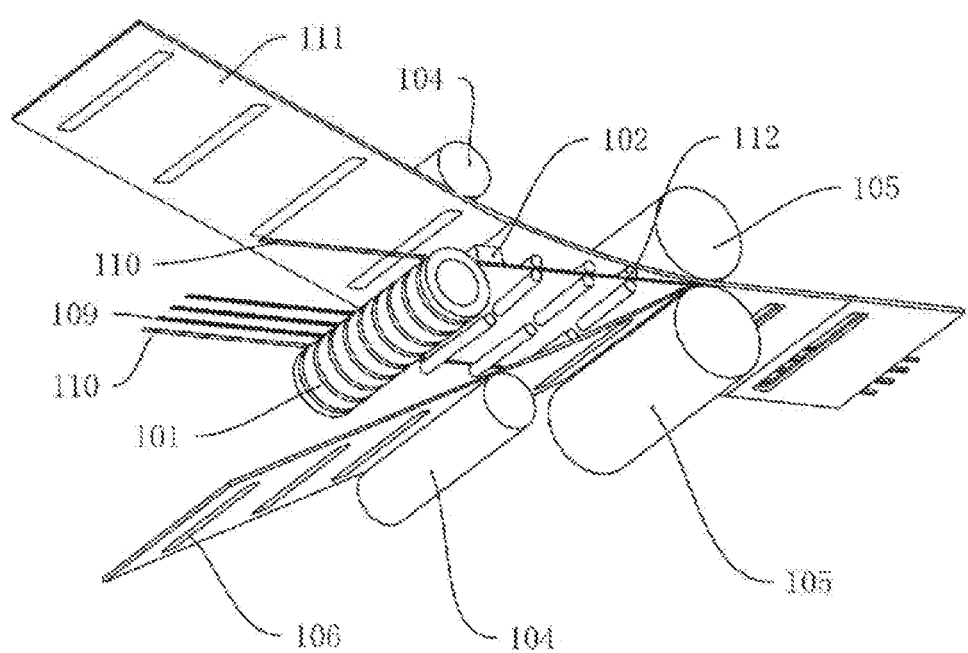
FIG. 16 is a plan view of a group of wires according to a second embodiment of the present disclosure.

FIG. 16 is a plan view of a group of wires according to a second embodiment of the present disclosure. As shown in FIG. 16, this embodiment is substantially the same as the first embodiment only except that the manipulator is replaced with a guide wheel, and that the wires and the films with the thermistor are fed into a heating roller.

According to the production device and method according to the above embodiments, the production speed can be increased and the better consistency of shapes of products can be achieved. In addition, better consistency of reaction speeds of the products can be achieved. Due to automated production, few operators are needed. The above-mentioned sensor has a small volume and a lightweight, and is easy to be used in a curved or narrow space, especially on a wearable device.

The above description is preferred implementations of the present disclosure, and it should be pointed out that those of ordinary skill in the art can also make several improvements and modifications without departing from the principle of the present disclosure. These improvements and modifications are also regarded as falling within the protection scope of the present disclosure.

In an embodiment, there is provided a sensing apparatus, comprising: a temperature sensor comprising: an upper film, a lower film, at least two wires provided between and covered by the upper film and the lower film, and a Negative Temperature Coefficient (NTC) thermistor welded between the wires; and a piercing terminal connected to tail ends of parallel wires of a FPC film of the temperature sensor, and comprising: a barbed metal strip and a rear end terminal connected to the metal strip, wherein the metal strip has a width not greater than that of flat copper wires at the tail ends of the parallel wires of the FPC film, and provided with a plurality of spikes extending perpendicularly and outwardly from one side of the metal strip along a lengthwise direction of the metal strip and a plurality of spikes extending perpendicularly and outwardly from the other side of the metal strip along the lengthwise direction, and projections of the plurality of spikes onto a projection plane perpendicular to the metal strip and extending along the lengthwise direction of the metal strip are arranged in turn at equal intervals.

In an embodiment, the upper film and the lower film each have a thickness less than 1 mm. In an embodiment the upper film and the lower film are each made of polyimide, PET plastic, aramid or aromatic polyamide, polyetheretherketone, polytetrafluoroethylene, polycarbonate, polyethylene, thermoplastic polyester or polystyrene. In an embodiment, the wires are formed by a calendering process, a printing process, or a chemical etching process. In an embodiment, the NTC thermistor is a die-type thermistor (SMD type thermistor), a diode-type thermistor, or a single-ended glass sealed-type thermistor. In an embodiment, a terminal or a connector receptacle is connected to a tail end of the integrated film type temperature sensor.

In an embodiment, there is provided a stamping strip, comprising a positioning strip of metal material and a plurality of piercing terminals, wherein the piercing terminals are arranged in parallel to each other at equal intervals, and are perpendicularly and fixedly connected to the positioning strip; wherein each of the piercing terminals comprises a barbed metal strip and a rear end terminal connected to the metal strip, and wherein the metal strip has a width not greater than that of flat copper wires at tail ends of parallel wires of a FPC film, and is provided a plurality of spikes extending perpendicularly and outwardly from one side of the metal strip along a lengthwise direction of the metal strip and a plurality of spikes extending perpendicularly and outwardly from the other side of the metal strip along the lengthwise direction, and projections of the plurality of spikes on a projection plane perpendicular to the metal strip and extending along the lengthwise direction of the metal strip are arranged in turn at equal intervals.

In an embodiment, a plurality of protrusions and plurality of positioning grooves, which are provided alternately at equal intervals, are symmetrically provided on two sides of the positioning strip along a lengthwise direction of the positioning strip, the protrusions have a same width as that of the positioning grooves, at least one of the protrusions and at least one of the positioning grooves are provided between positions on the positioning strip which correspond to two adjacent piercing terminals, the protrusions are perpendicular to a surface of the positioning strip, and a center distance between the protrusion and the positioning groove is the same as a center distance between two flat copper wires at the tail ends of the parallel wires of the FPC film; and a plurality of positioning holes which are arranged at equal intervals are further provided in the middle of the positioning strip along the lengthwise direction of positioning strip, and at least two ones of the positioning holes between positions on the positioning strip which correspond to two adjacent piercing terminals has a center distance, which is the same as that between the two flat copper wires at the tail ends of the parallel wires of the FPC film. In an embodiment, the positioning strip and the piercing terminals are integrally formed into a stamped piece. In an embodiment, the positioning strip and the piercing terminals each have a material of phosphor bronze, phosphor copper or brass. In an embodiment, the positioning strip and the piercing terminals each have a thickness not more than 1 mm.

In an embodiment, there is provided a method for connecting a stamping strip to tail ends of parallel wires of an FPC film, comprising steps of: stacking at least two stamping strips when a center distance between two adjacent metal strips on the stamping strip is greater than a center distance between two flat copper wires of the parallel wires of the FPC film; causing a center distance between two adjacent metal strips on the stacked stamping strips to become equal to the center distance between the two flat copper wires of the parallel wires of the FPC film; and connecting two adjacent piercing terminals of the two stacked stamping strips to the two flat copper wires at tail ends of the parallel wires of the FPC film by a stamping process in a piercing manner.

In an embodiment, when a center distance between two adjacent rear end terminals on the stamping strips is greater than the center distance between the two flat copper wires of the parallel wires of the FPC film, at least one of the two adjacent rear end terminals is biased towards the outside of a central line of the two adjacent metal strips.

In an embodiment, there is provided a production device for manufacturing an integrated film type temperature sensor, comprising: a first guide wheel; a guide groove located downstream of the first guide wheel; a die located directly above a front end of the guide groove and configured to punch and cut off copper wires; second guide wheels located at upper and lower sides of the first guide wheel and configured to guide an upper film and a lower film; a manipulator or a third guide wheel located downstream of the guide groove and configured to pull the copper wires; a hot pressing roller located downstream of the manipulator or the third guide wheel; and a slitter located downstream of the hot pressing roller; wherein glue is coated onto inner sides of the upper film and the lower film respectively, a plurality of NTC resistors are welded between two parallel copper wires at an interval so that a group of copper wires is formed, and multiple groups of copper wires are spaced apart in parallel to each other and are guided to enter the front end of the guide groove via the first guide wheel, the die punches and cuts off the copper wires, the manipulator pulls the cut copper wires along the guide groove to a position between the upper film and the lower film coated with the glue, the cut copper wires are clamped between two insulating sheets coated with glue and guided to enter the hot pressing roller so as to be hot pressed, and the slitter slits the hot-pressed upper film and lower film.

In an embodiment, the upper film and the lower film each have a thickness less than 1 mm.

What is claimed is:

1. A piercing terminal configured to be connected to at least one tail end of parallel wires of a flexible printed circuit (FPC) film, the piercing terminal comprising a barbed metal strip, and a stamping strip with positioning holes therein, the stamping strip comprising a positioning strip, wherein:
    the positioning strip has a plurality of protrusions and a plurality of positioning grooves which are arranged alternately at essentially equal intervals and symmetrically on two opposite sides of the positioning strip in a lengthwise direction of the positioning strip,
    the protrusions each have an essentially same width as that of the positioning grooves, at least one of the protrusions and at least one of the positioning grooves are provided between positions on the positioning strip which correspond to two adjacent piercing terminals,
    a center distance between the at least one protrusion and the at least one positioning groove is configured to be the same as a center distance between two flat wires at the tail ends of the parallel wires of the FPC film,
    the positioning strip further comprises a plurality of positioning holes arranged at essentially equal intervals at a middle of the positioning strip in the lengthwise direction thereof,
    at least two ones of the positioning holes, which are located between positions on the positioning strip which correspond to two adjacent piercing terminals, has a center distance therebetween that is configured to be essentially the same as that between two flat wires at the tail ends of the parallel wires of the FPC film,
    the piercing terminal comprises a rear end terminal,
    in a state where a center distance between two adjacent rear end terminals is arranged to be greater than the center distance between the two flat wires of the parallel wires of the FPC thin film, at least one of the two adjacent rear end terminals is biased towards the outside of a central line of two adjacent metal strips, so that a center distance between two adjacent metal strips is essentially equal to the center distance between the two flat wires of the parallel wires of the FPC thin film, and in a state where a center distance between two adjacent metal strips is arranged to be greater than the center distance between two flat wires of parallel wires of the FPC thin film, at least two stamping strips are configured to be stacked, such that a center distance between two adjacent metal strips on the stacked stamping strips is essentially equal to the center distance between the two flat wires of the parallel wires of the FPC thin film, and such that two adjacent piercing terminals of the two stacked stamping strips are connected to the two flat wires at the tail ends of the parallel wires of the FPC thin film by a punching process in a piercing manner.

2. The piercing terminal according to claim 1, wherein:
the metal strip has a width not greater than that of flat wires at the tail ends of the parallel wires of the FPC film,
the metal strip comprises a first spike and a second spike extending essentially perpendicularly and outwardly from one side of the metal strip in a lengthwise direction of the metal strip, and a third spike and a fourth spike extending essentially perpendicularly and outwardly from the other side of the metal strip in the lengthwise direction,
projections of the first spike, the third spike, the second spike and the fourth spike onto a projection plane perpendicular to the metal strip and extending in the lengthwise direction of the metal strip are arranged in turn at essentially equal intervals, and
the rear end terminal is biased towards the outside of a central line of the two adjacent metal strips.

3. The piercing terminal according to claim 1, wherein a plurality of the piercing terminals are arranged in parallel to each other at essentially equal intervals, and are essentially perpendicularly and fixedly connected to the positioning strip.

4. The piercing terminal according to claim 1, wherein the positioning strip and the piercing terminal are integrally formed into a stamped piece.

5. The piercing terminal according to claim 4, wherein the positioning strip and the piercing terminal each have a material of phosphor bronze, phosphor copper or brass.

6. The piercing terminal according to claim 5, wherein the positioning strip and the piercing terminal each have a thickness not more than 1 mm.

7. A method for connecting a stamping strip to tail ends of parallel wires of a flexible printed circuit (FPC) film, wherein the stamping strip comprises a positioning strip of metal material and a plurality of piercing terminals, wherein the piercing terminals are arranged essentially in parallel to each other at essentially equal intervals and are essentially perpendicularly and fixedly connected to the positioning strip and wherein each of the piercing terminals comprises a barbed metal strip, the method comprising:

stacking at least two stamping strips when a center distance between two adjacent metal strips on one of the stamping strips is greater than a center distance between two flat wires of parallel wires of the FPC film;

causing a center distance between two adjacent metal strips on the stacked stamping strips to become essentially equal to the center distance between the two flat wires of the parallel wires of the FPC film; and connecting two adjacent piercing terminals of the two stacked stamping strips to the two flat wires at the tail ends of the parallel wires of the FPC film by a stamping process in a piercing manner, wherein each of the piercing terminals comprises a rear end terminal and when a center distance between two adjacent rear end terminals on one of the stamping strips is greater than the center distance between the two flat wires of the parallel wires of the FPC film, at least one of the two adjacent rear end terminals is biased towards the outside of a central line of the two adjacent metal strips, so that the center distance between the two adjacent metal strips becomes essentially equal to the center distance between the two flat wires of the parallel wires of the FPC film.

8. The method according to claim 7, wherein:
the barbed metal strip of the at least one piercing terminal has a width not greater than that of flat wires at the tail ends of the parallel wires of the FPC film,
the barbed metal strip of the at least one piercing terminal comprises a first spike and a second spike extending essentially perpendicularly and outwardly from one side of the barbed metal strip in a lengthwise direction of the barbed metal strip, and a third spike and a fourth spike extending essentially perpendicularly and outwardly from the other side of the barbed metal strip in the lengthwise direction,
projections of the first spike, the third spike, the second spike and the fourth spike onto a projection plane perpendicular to the barbed metal strip and extending in the lengthwise direction of the barbed metal strip are arranged in turn at essentially equal intervals, and
the rear end terminal of the at least one piercing terminal is biased towards the outside of a central line of two adjacent metal strips.

9. The method according to claim 7, wherein a positioning strip and the associated piercing terminals are integrally formed into a stamped piece.

10. The method according to claim 7, wherein a positioning strip and the associated piercing terminals each have a material of phosphor bronze, phosphor copper or brass.

11. The method according to claim 7, wherein a positioning strip and the associated piercing terminals each have a thickness not more than 1 mm.

12. The method according to claim 7, wherein a positioning strip and the associated piercing terminals each have a thickness not more than 1 mm.

13. A method of connecting a connector to at least one tail end of parallel wires of a flexible printed circuit (FPC) film, the method comprising:

connecting the at least one tail end to a piercing terminal, the piercing terminal comprising a barbed metal strip, and a stamping strip with positioning holes therein, the stamping strip comprising a positioning strip, wherein:
the positioning strip has a plurality of protrusions and a plurality of positioning grooves which are arranged alternately at essentially equal intervals and symmetrically on two opposite sides of the positioning strip in a lengthwise direction of the positioning strip,
the protrusions each have an essentially same width as that of the positioning grooves, at least one of the protrusions and at least one of the positioning grooves are provided between positions on the positioning strip which correspond to two adjacent piercing terminals,
a center distance between the at least one protrusion and the at least one positioning groove is configured to be the same as a center distance between two flat wires at the tail ends of the parallel wires of the FPC film, the positioning strip further comprises a plurality of positioning holes arranged at essentially equal intervals at a middle of the positioning strip in the lengthwise direction thereof, at least two ones of the positioning holes, which are located between positions on the positioning strip which correspond to two adjacent piercing terminals, has a center distance therebetween that is configured to be essentially the same as that between the two flat wires at the tail ends of the parallel wires of the FPC film, each piercing terminal comprises a rear end terminal, in a state where a center distance between two adjacent rear end terminals is greater than the center distance between the two flat wires of the parallel wires of the FPC thin film, at least one of the two adjacent rear end terminals is biased towards the outside of a central line of two adjacent metal strips, so that a center distance between two adjacent metal strips is essentially equal to the center distance between the two flat wires of the parallel wires of the FPC thin film, and in a state where a center distance between two adjacent metal strips is greater than the center distance between two flat wires of parallel wires of the FPC thin film, at least two stamping strips are stacked, such that a center distance between two adjacent metal strips on the stacked stamping strips is essentially equal to the center distance between the two flat wires of the parallel wires of the FPC thin film, and such that two adjacent piercing terminals of the two stacked stamping strips are connected to the two flat wires at the tail ends of the parallel wires of the FPC thin film by a punching process in a piercing manner.

14. The method according to claim 13, wherein:

the metal strip has a width not greater than that of flat wires at the tail ends of the parallel wires of the FPC film, the metal strip comprises a first spike and a second spike extending essentially perpendicularly and outwardly from one side of the metal strip in a lengthwise direction of the metal strip, and a third spike and a fourth spike extending essentially perpendicularly and outwardly from the other side of the metal strip in the lengthwise direction, projections of the first spike, the third spike, the second spike and the fourth spike onto a projection plane perpendicular to the metal strip and extending in the lengthwise direction of the metal strip are arranged in turn at essentially equal intervals, and the rear end terminal is biased towards the outside of a central line of the two adjacent metal strips.

15. The method according to claim 13, wherein a plurality of the piercing terminals are arranged in parallel to each other at essentially equal intervals, and are essentially perpendicularly and fixedly connected to the positioning strip.

16. The method according to claim 13, wherein the positioning strip and the piercing terminal are integrally formed into a stamped piece.

17. The method according to claim 13, wherein the positioning strip and the piercing terminal each have a material of phosphor bronze, phosphor copper or brass.

18. The method according to claim 13, wherein the positioning strip and the piercing terminal each have a thickness not more than 1 mm.

* * * * *